United States Patent [19]

Krenmayr et al.

[11] Patent Number: 4,557,833

[45] Date of Patent: Dec. 10, 1985

[54] APPARATUS FOR DEWATERING WATER-CONTAINING MATERIALS

[75] Inventors: Franz Krenmayr, Linz; Franz Lichtenegger, Liezen; Peter Göschl, Aigen, all of Austria

[73] Assignee: Voest-Alpine Aktiengesellschaft, Vienna, Austria

[21] Appl. No.: 520,643

[22] Filed: Aug. 5, 1983

[30] Foreign Application Priority Data

Aug. 13, 1982 [AT] Austria ................................ 3097/82

[51] Int. Cl.[4] ................................................ B01D 33/14

[52] U.S. Cl. .................................... 210/386; 210/400; 100/118; 100/199; 100/151

[58] Field of Search ............... 210/783, 791, 400, 401, 210/386; 209/272, 307, 308; 162/273, 274, 301; 100/118-120, 150-154, 103, 165, 199

[56] References Cited

U.S. PATENT DOCUMENTS

| | | | |
|---|---|---|---|
| 157,402 | 12/1874 | Hunter | 210/250 |
| 3,045,410 | 7/1962 | Floyd | 210/401 |
| 3,537,584 | 12/1970 | MacDonald | 210/400 |
| 3,581,876 | 6/1971 | Keith | 100/151 |
| 3,894,486 | 7/1975 | Sparowitz et al. | 162/274 |
| 4,066,548 | 1/1978 | Olson | 210/400 |
| 4,159,947 | 7/1979 | Brooks | 210/401 |
| 4,292,173 | 9/1981 | Parmontier | 210/400 |

*Primary Examiner*—David L. Lacey

*Attorney, Agent, or Firm*—Cushman, Darby & Cushman

[57] ABSTRACT

In an apparatus for dewatering water-containing materials, endless sieve belts (1,2) are passed over rolls (8) bearingly supported within substantially mutually parallel frames (7, 11) one of which is movable in direction to the other and is additionally shiftable in a substantially parallel relation to the other and thus transversely to the direction of said adjusting movement and can be fixed in its position. For facilitating the coordination of said adjusting movement and said shifting movement, a gate-type guide (10) forming abutments is connected with one frame (7) and has its gate (12) shaped like a U having legs (13, 14) of different length, retaining bolts or, respectively, pins (26) of the other frame (11) engaging said gate (12).

14 Claims, 3 Drawing Figures

APPARATUS FOR DEWATERING WATER-CONTAINING MATERIALS

Figure 1:
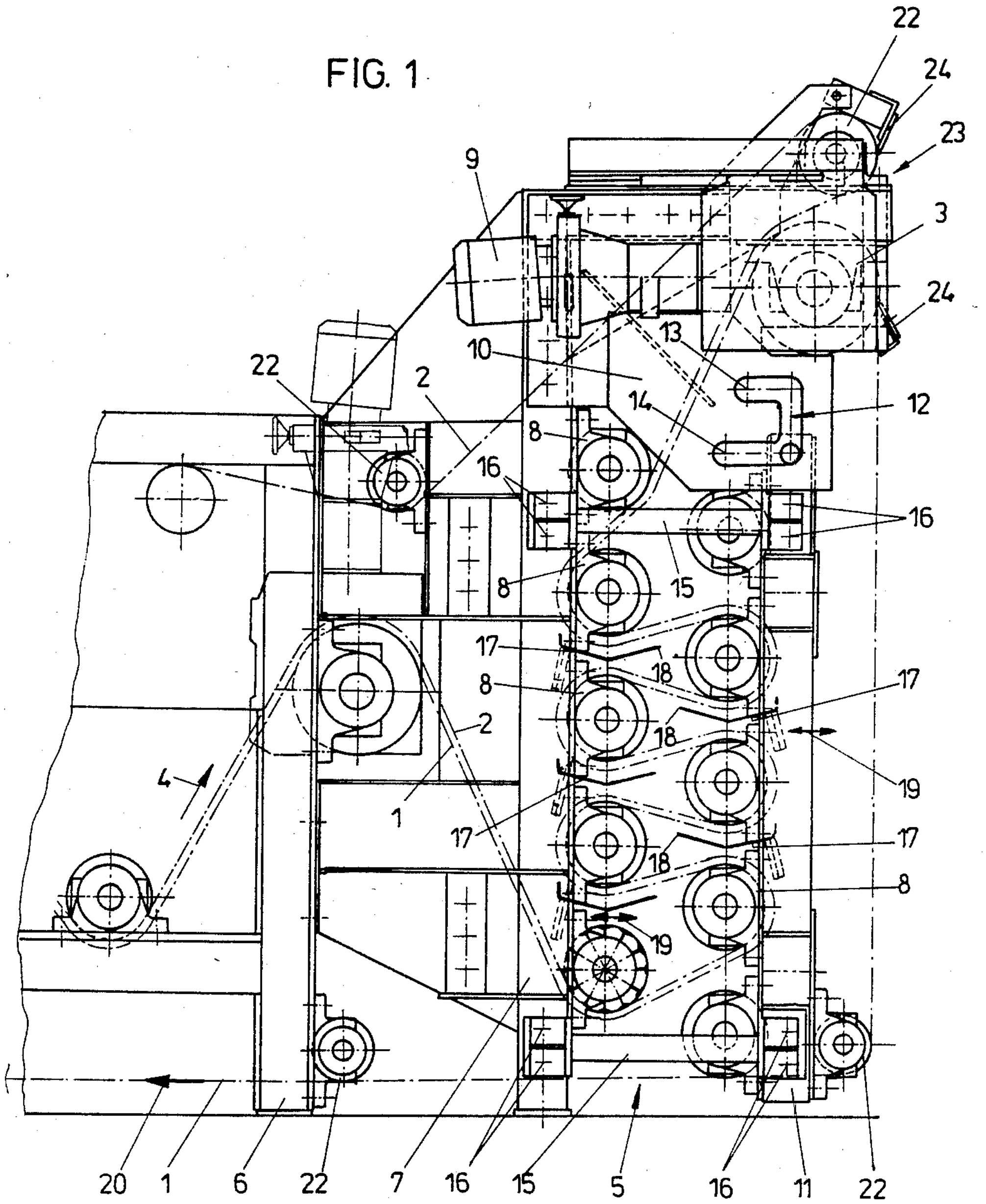

The invention refers to an apparatus for dewatering water-containing materials such as sludges, in which the material, preferably having already been pre-dewatered, is passed between water-permeable bands or, respectively, sieve belts travelling along a closed path over rolls bearingly supported in at least two separated frames arranged in a substantially parallel relation, at least one frame being adjustable in direction to the opposite frame.

In such apparatuses, the rollers of the mutually opposing frames can form a support for the sieve belts and can define in dependence on their adjustment a wedge-shaped gap, whereby, above all, fibrous sludge can be dewatered in a particularly satisfactory manner. It is equally possible to arrange the rolls of mutually opposing frames staggered in longitudinal direction, so that the axes of the rolls assume, seen in a lateral view, a position so as to fill gaps, which affords a frequent line contact. With such an arrangement the enclosed sludge is subject to frequent shearing action, which, with some types of sludge, results in a better degree of dewatering. Such apparatuses are most frequently provided downstream a dewatering device provided with sieve belts, and for achieving high pressing forces per unit area rolls having a relatively small diameter are, as a rule, used. This small roll diameter can, if the sieve belts are passed over the rolls of adjacent frames for the respective maximum looping angle, be used to exert a high flexing work or fulling work on the enclosed sludge, because the belt velocities of said sieve belts running over different radii are different. Such dewatering being effected by using a greater relative movement between the belts is better suited for individual sludge types than dewatering between sieve belts being pressed one against the other by means of rolls.

The invention now aims at providing an apparatus of the initially mentioned type and which can with low expenditure be converted to various arrangements for dewatering sludges and which allows to realize various different embodiments of such post-dewatering stages with a higher number of non-varying constructional parts. For solving this task, the invention essentially consists in that at least some rolls of at least one frame, preferably all rolls of one frame, can, together with the frame, be shifted in substantially parallel relation to the second frame and in transverse direction to the direction of adjustment and can be fixed in their position.

The already known possibility for adjusting the frame in direction to the opposite frame allows to adjust a wedge angle even if the sieve belts are passed between the rolls. The possibility to adjust both frames one in direction to the other also serves the purpose to adjust the distance between the adjacent sieve belts and this allows to match the required through-put of material. In the same sense, also a pressing force can be applied onto the sieve belts for improving the dewatering efficiency. In view of at least one frame being now adapted to be additionally shifted in parallel relation to the second frame and in transverse direction to the direction of adjustment, the rolls of one frame can be shifted relative to the rolls of the other frame in a manner that a position so as to fill gaps becomes possible. In this gap-filling position there results a more frequent line contact and thus a defined shearing effect on the sludge, which allows to influece the dewatering efficiency. Apart from the relative adjustability of the frames, said both frames can now also be moved to such a distance one from the other that the sieve belts are no more passed between the rolls with simultaneous line contact but are passed around the rolls so that with a corresponding looping angle and pressing action per unit area fulling work can be increased. In this case, positioning so as to fill gaps is advantageous for equalizing the loads acting on both frames and for simplifying mutual supporting of the frames. In view of at least some of the rolls of at least one frame being adapted to be staggered relative to the rolls of the other frame, further adaptation to the requirements can be achieved, because part of the roll of the dewatering apparatus can be positioned so as to fill gaps and some further rolls can be arranged opposite to the rolls of opposing frames. It is, however, possible to adjust for such an adjustment the frame itself with all rolls supported on this frame relative to the opposite frame.

Adjustment of such a frame can in a simple manner be effected by using, for example, a pulley block. In this case it is of advantage if the rolls of each frame have substantially the same diameter and are arranged in one single plane of the frame and if shiftability of one of the frames relative to the other frame for shifting movement in transverse direction to the direction of adjustment is limited by abutments. Lifting of the frame and particularly lowering of the frame is thus extremely simplified because, if both frames are substantially vertically arranged, downward movement can be effected by gravity until the abutment becomes effective. Above all, the abutments allow a reliably defined positioning of opposite rolls so as to fill gaps and a defined position in which opposite rolls are located in equal cross-sectional planes.

The arrangement is preferably such that all rolls of all frames have equal diameters and that the axial distances of adjacent rolls of each frame are one and the same and preferably maximally equal to twice the diameter of the roll. With such an embodiment adjustment of the frames in parallel relation one to the other allows to achieve both, an adjustment in which all rolls of opposing frames are opposite one relative to the other and thus form roll pairs, as well as an adjustment in which all rolls located at one side of the sieve belt are centered between the rolls located at the other side of the sieve belt, so that the number of areas of line contact is increased from originally $n/2$, wherein n is the total number of dewatering rolls, to $n-1$. Simultaneously with such increase of the number of areas of line contact there is, as compared with the originally and in most cases straight path of movement, achieved a more or less undulatory path of movement of sieve, so that a certain fulling action is exerted. In this case, the bearings of all rolls of the frame are shifted in common with the respective frame, so that separate adjustment of the individual bearings of the dewatering rolls is not necessary.

If both frames are arranged for having the sieve belts passed between the mutually opposite rolls, adjustment of the width of the gap between the sieve belts and adjustment of the pressing force can reliably be effected in a simple manner by tension elements being hydraulically actuated or actuated by an electro motor. For providing a simple conversion to an arrangement in which the frames are so distant one from the other that the sieve belts are allowed to pass for a great looping angle over the individual rolls of opposite frames, this tensioning elements shall be adapted to be releaseably fixed to the frames with the aid of simple means. Such a simply releaseable connection of the tensioning elements with the frame, is, however, of advantage if both frames are arranged for having the sieve belts passed between the rolls and if a frame is shifted from that position in which the opposite rolls are arranged in equal cross-sectional planes into a position in which the rolls are staggered. In this case the arrangement is, according to an advantageous embodiment of the invention such that the mutually opposite frames have attachment places for at least one, preferably resilient, tensioning element, noting that on at least one frame there are arranged two attachment places for releaseably fixing one respective tensioning element, said attachment places being staggered in longitudinal direction of the frame for a distance corresponding to the shifting path defined by the abutments. Thus the tensioning element can again be fixed in their new position after having shifted the frame for half the axial distance of adjacent rolls, noting that the tensioning forces applied to the frames can mutually counteract with identical angles as in the respective other position. As a rule, these tensioning forces are applied in perpendicular direction relative to the plane of the frame.

A constructively particularly simple embodiment for adjusting a frame consists in that the abutments for limiting the shifting movement in transverse direction to the adjusting direction are formed by a gate-type guide connected with one frame and having its gate essentially shaped like an U and the free U-legs thereof directed to the respective opposite frame, retaining bolts or, respectively, pins of the respective other frame engaging said gate-type guide. With such a gate-type guide, two exactly defined shifting positions can be assumed, noting that by the legs of the U-shapedly extending gate a guide for the adjusting movement of both frames, one relative to the other, is formed. The distance of the mutually parallel legs of the U-shaped gate of the gate-type guide thereby preferably corresponds to half the distance of the axes of adjacent rolls of a frame.

Because when positioning the rolls so as to fill gaps, the rolls of one frame can be adjusted close to the other frame it is, for achieving a frequent line contact, favourable if one of both legs of the U-shaped gate of the gate-type guide is longer than the second leg. This longer leg then allows to guide the second frame till an end position in which both frames are located closer one to the other than when being guided within their respective other leg, in which case the rolls of opposite frames are located in the same cross-sectional plane. In view of the position of the ends of both legs it is made sure that any over-load of the roll axes by immediately pressing together the rolls in both of said shifting positions of the frames is prevented.

Preferably both frames have at least four attachment places. These both frames can by means of two tensioning elements be adjusted one relative to the other so that there is formed a wedge from the intake end till the discharge end of the press, and on account of the possible shifting positions of one frame it is advantageous to provide at least at one side two adjacent attachment places for the tensioning elements.

If also the other frame has two pairs of attachment places, a support resistive against angular movement can be connected with the frames, noting that in this case the frames are kept so distant one from the other that the sieve belts run around the rolls for a great looping angle. For this purpose it is, however, in most cases necessary to give the sieve belts a greater length or to replace the sieve belts by longer sieve belts. The support resistive against angular movement can, in this case, be realized by carriers having a substantially I-shaped cross-section and being arranged at both ends of the frames and being screwed into the frame or being secured in position by simple safety pins.

Preferably, the frames are vertically arranged, and below one respective roll drop receiving dishes are arranged on the frames, thereby preventing dropping down of emerging water on rolls located at a lower level and thereby preventing re-entering of already expelled water into the sheet of material to be dewatered. The same drop receiving dishes may, with such a vertical arrangement of the frames, also be used for receiving emerging water if the sieve belts are passed between opposite supporting rolls, noting that in this case the drop receiving dishes must be adjustable in direction to the sieve belts. Therefore, the arrangement is preferably such that the drop receiving dishes are arranged on a respective frame for being shifted in a substantially horizontal direction and for being fixed in their shifting position and are provided with a stripping lip at their edge facing the respective opposite frame. In this manner, the stripping lip can be adjusted in direction to the sieve belts and strip the emerging water in both, in the staggered position as well as in the position in which the opposite rolls are arranged in the same cross-sectional planes. The drop-receiving dishes are preferably designed such that the roll as well as the sieve belt cooperates with a stripping lip.

In the following, the invention is further explained with reference to an embodiment shown in the drawing.

Figure 2:
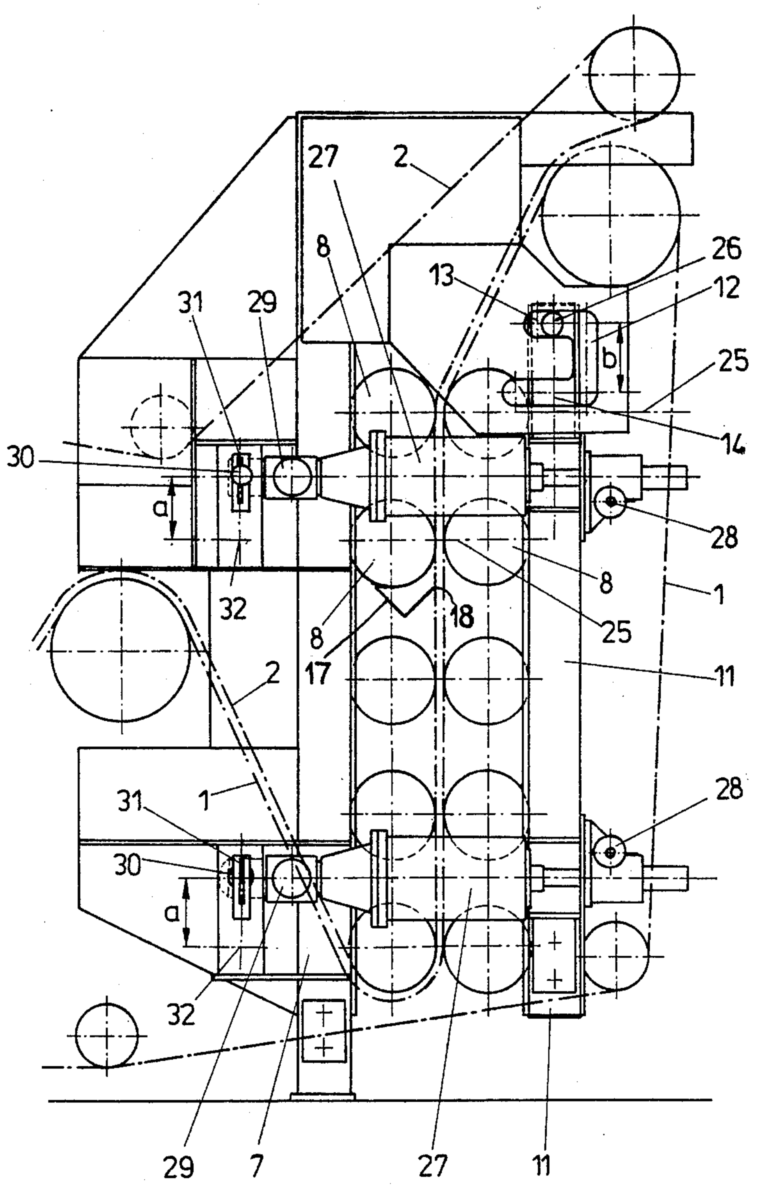
Figure 3:
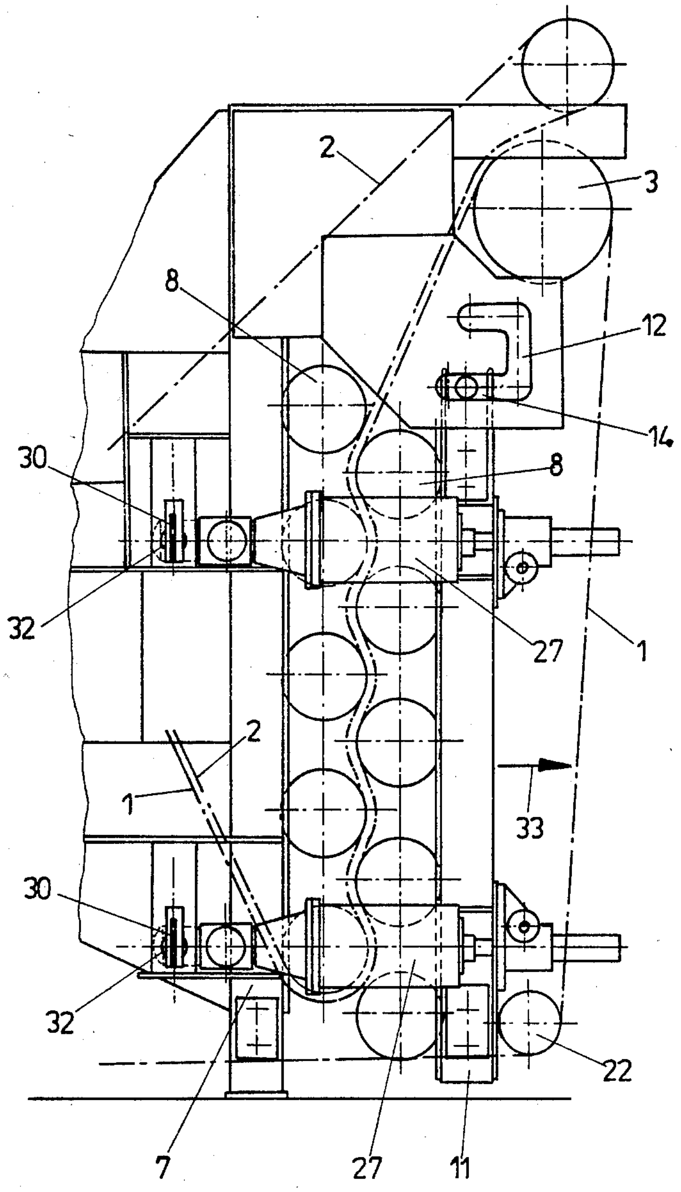

In the drawing:

FIG. 1 shows a first arrangement of the frames of a post-dewatering stage of a sieve belt press, FIG. 2 shows a second position of the frames of the same post-dewatering stage and FIG. 3 is a further position of the frames of the same post-dewatering stage.

In FIG. 1, the sieve belts are designated 1 and 2. The sieve belts are extracted from a preceding sieve belt press in direction of the arrow 4 by means of a drive drum 3 common for both sieve belts and arranged adjacent the discharge end and are then passed through a high-pressure dewatering stage 5. A first rigid frame 7 carrying rolls 8 is connected with the frame 6 of the sieve belt press. The rigid frame 7 also carries the drive motor 9 for the drive drum 3 as well as a gate-type guide 10 to which is pivotally linked the movable frame 11. The gate-type guide 10 has a U-shaped gate 12, the short free leg of which is designated 13 and the long free leg of which is designated 14. Also the movable frame 11 has rolls 8 having the same diameter as the rolls of the rigid frame 7. In the arrangement according to FIG. 1, both frames are connected one with the other with interposition of spacer members 15. The frame 7 as well as the frame 11 comprise two pairs of attachment places 16 which allow to fix the spacer members 15 in a manner resistive to angular movement. The sieve belts 1 and 2 are passed around the rolls 8 for a respective central angle of more than 180°. In view of the different belt velocity of the respective inner sieve belt relative to the outer sieve belt, a fulling action is with this arrangement exerted on the material enclosed between the sieve belts, thus obtaining a good dewatering effect. The water expelled from the material is received by drop receiving dishes 17 arranged below the respective rolls and having their edge 18 facing the respective other frame designed as a stripping lip. In an analogous manner, also the second edge extending in essentially parallel relation to the sieve belt can be designed as stripping lip and be adjusted in direction to the rolls by swivelling or shifting the drop receiving dish 17. By means of these second stripping lips, water emerging from the material can be stripped off the rolls themselves. The drop receiving dishes are connected with the respective frames 7 and 8 for being shifted in transverse direction in the sense of the double-arrow 19, so that the stripping lip 18 can be moved in direction to the sieve belts and to the sieve rolls in the arrangements according to the FIGS. 2 and 3.

The sieve belts 1 and 2 run back to the sieve belt press in the sense of the arrows 4 and 20 and are again charged with material to be dewatered but this is not shown. The deflector rolls for these sieve belts are designated 22, noting that some of these deflector rolls can be adjustable for adjusting the belt tension or, respectively, for controlling the travel path of the sieves. At the discharge end 23 there are provided scrapers 24 for removing the dewatered material from the sieve belts.

In the position according to FIG. 2, the frame 11 is lifted relative to the frame 7 such that the mutually opposite rolls 8 are now located in common cross-sectional planes 25. In this case, the sieve belts 1 and 2 are passed between the mutually opposite rolls 8 and are supported by these rolls 8. The frame 11 is guided within the short leg 13 of the U-shaped gate 12 of the gate-type guide by means of a pin 26 and both frames 7 and 11 are pressed one against the other by tensioning elements 27. By adjusting both tensioning elements 27 in different manner a gap tapering in upward direction can be obtained between the sieve belts, whereby a satisfactory dewatering efficiency is achieved particularly with fibre-containing sludge. The tensioning elements 27 are driven by electro motors 28 and aneroid pressure-gauges 29 are provided for controlling the tension force. The tensioning elements 27 are fixed to the rigid frame by means of safety pins 30 at a suitable attachment place 31. On the same rigid frame there are provided attachment places 32 which are displaced for a distance a, said distance a corresponding to the distance b of said both legs 13 and 14 of the gate-type guide.

The lowered position, in which the rolls 8 of the frame 11 are changed in position relative to the rolls 8 of the frame 7 so as to fill gaps, is shown in FIG. 3. Also in this case, the sieve belts 1 and 2 are passed between the mutually opposite rolls of opposite frames and the tensioning elements 27 are now fixed in position at the attachment places 32 by means of the safety pins 30. The frame 11 is now guided within the longer leg 14 of the gate 12 of the gate-type guide for being moved in direction to the frame 7, so that in this position of the rolls so as to fill gaps said both frames 7 and 11 can be moved in closer proximity than in the position shown in FIG. 2 according to which the rolls 8 of opposite frames are arranged in the respective same cross-sectional planes 25.

Adjusting the frame 11 in parallel relation to the frame 7 is possible if the frame 11 is moved outwardly in direction of the arrow 33. In this case, the safety pin 26 can in height direction be given an other position within that area of the gate which connects its both free legs 13 and 14, and for such height adjustment there can be used in a simple manner a pulley block or the like.

The dewatering apparatus can also independently be operated without a preceding dewatering stage. However, at least one pre-dewatering stage can precede, the above described dewatering apparatus. The frames for the individual rolls are preferably arranged in a substantially vertical manner so that the frame or the frames of the sieve is lowered or lifted relative to the frame or the frames of the other sieves. However, it is also possible to operate the arrangement if the frames or, respectively, the frame within which are located the bearings for the press rolls assume or, respectively, assumes an inclined position or horizontal position.

For achieving the compression force there can be used in a manner known per se compression springs, thereby obtaining a pressure increasing with increasing sludge cake thickness.

What is claimed is:

1. Apparatus for dewatering water-containing materials such as sludges, in which the material, preferably having already been dewatered, is passed between water-permeable bands or sieve belts travelling along a closed path over rolls supported in bearings in at least two separated frames arranged in a substantially parallel relation, means to shift all of the rolls of at least one first frame in a direction parallel to the rolls of a second frame and means to shift all of the rolls of said first frame in a direction transverse to said parallel shifting movement and means to fix the rollers of said first frame so they are positioned opposite the rollers of the second frame in a first fixed position and means to fix the rollers of said first frame so they are positioned in a staggered manner with respect to the rollers of said second frame.

2. Apparatus as in claim 1 wherein the rolls of each frame have substantially the same diameter and are arranged in one single plane of the respective frame and including abutments for limiting the shifting movement of the rollers of said first frame.

3. Apparatus as in claim 2 wherein the frames have attachment places for at least one tensioning element, and wherein on at least one frame there are arranged two attachment places for releasably fixing one respective tensioning element, said attachment places being displaced in longitudinal direction of the frame for a distance corresponding to the shifting path defined by the abutments.

4. Apparatus as in claim 2 wherein the abutments are formed by a gate-type guide connected with one frame and having its gate essentially shaped like an U, the free U-legs thereof being directed to the opposite frame, and retaining means associated with the other frame engaging said gate-type guide.

5. Apparatus as in claim 4 wherein the distance of the mutually parallel legs of the U-shaped gate corresponds to half the distance of the axes of adjacent rolls of one of said frames.

6. Apparatus as in claim 4 wherein one of said both legs of the U-shaped gate is longer than the other leg.

7. Apparatus as in claim 2 wherein both frames have at least four attachment places each.

8. Apparatus as in claim 1 wherein all rolls of both frames have the same diameter and wherein the distances of the axes of adjacent rolls of each frame are the same.

9. Apparatus as in claim 1 wherein the frames are vertically arranged and wherein drop-receiving dishes are arranged on the frames below one of said respective frames.

10. Apparatus as in claim 9 including means for shifting the drop receiving dishes on one of said respective frames in a substantially horizontal direction and for fixing their shifting position, the drop receiving dishes having a stripping lip at their edge facing the respective opposite frame.

11. Apparatus as in claim 9 wherein the drop receiving dishes comprise stripping lips positioned and arranged to act on the sieve belt and on the rolls.

12. Apparatus for dewatering water-containing material comprising: two water permeable bands or sieve belts for receiving water-containing material; two groups of rolls for guiding the bands or belts, the rolls in each group having axes parallel to each other and lying in a common plane and being supported in separated frames, the two common planes being spaced apart and parallel to each other; means to shift all of the rolls of at least one first frame in a direction parallel to the rolls of a second frame and means to shift all of the rolls of said first frame in a direction transverse to said parallel shifting movement and means to fix the rollers of said first frame so they are positioned opposite the rollers of the second frame in a first fixed position and means to fix the rollers of said first frame so they are positioned in a staggered manner with respect to the rollers of said second frame.

13. Apparatus as in claim 12 wherein the rolls of each group are rotatably supported in one of said respective frames, so that wherein one of said frames is movable in said transverse and parallel directions and wherein both said moving means cooperate with said one frame to move the latter and the associated rolls in said transverse and parallel directions.

14. Apparatus for dewatering water-containing material comprising: two water permeable bands or sieve belts for receiving water-containing material; two groups of rolls for guiding the bands or belts, the rolls in each group being rotatably mounted in a respective frame and having axes parallel to each other and lying in a common plane, the two common planes being spaced apart and parallel to each other; means for shifting at least one frame in a direction parallel to the other frame, means for shifting said one frame in a direction transverse to said parallel shifting movement, means for fixing said one frame so that the rollers thereof are positioned opposite the rollers of said other frame in a first fixed position, and means for fixing said one frame so that the rollers thereof are positioned in a staggered manner with respect to the rollers of said other frame.

* * * * *